United States Patent
Carr et al.

(10) Patent No.: US 12,297,109 B1
(45) Date of Patent: May 13, 2025

(54) SYNGAS AND METHOD OF MAKING THE SAME

(71) Applicant: HYCO1, Inc., Houston, TX (US)

(72) Inventors: Gregory Carr, Houston, TX (US);
David DeVilliers, Katy, TX (US); Kurt A. Dieker, Maize, KS (US)

(73) Assignee: HYCO1, Inc., Houston, TX (US)

( * ) Notice: Subject to any disclaimer, the term of this patent is extended or adjusted under 35 U.S.C. 154(b) by 0 days.

(21) Appl. No.: 18/638,330

(22) Filed: Apr. 17, 2024

(51) Int. Cl.
| | |
|---|---|
| *C01B 3/40* | (2006.01) |
| *B01J 23/755* | (2006.01) |
| *B01J 35/30* | (2024.01) |
| *B01J 35/63* | (2024.01) |
| *B01J 37/02* | (2006.01) |
| *B01J 37/08* | (2006.01) |

(52) U.S. Cl.
CPC .............. *C01B 3/40* (2013.01); *B01J 23/755* (2013.01); *B01J 35/397* (2024.01); *B01J 35/633* (2024.01); *B01J 37/0236* (2013.01); *B01J 37/08* (2013.01); *C01B 2203/0233* (2013.01); *C01B 2203/1058* (2013.01); *C01B 2203/1241* (2013.01); *C01B 2203/1614* (2013.01); *C01B 2203/1628* (2013.01)

(58) Field of Classification Search
CPC .............. C01B 3/40; C01B 2203/0233; C01B 2203/1058; C01B 2203/1241; C01B 2203/1614; C01B 2203/1628; B01J 23/755; B01J 35/397; B01J 35/633; B01J 37/0236; B01J 37/08
See application file for complete search history.

(56) References Cited

U.S. PATENT DOCUMENTS

| | | |
|---|---|---|
| 2014/0145117 A1 | 5/2014 | Bal et al. |
| 2015/0307352 A1 | 10/2015 | Kumar |
| 2018/0272322 A1 | 9/2018 | Carr et al. |
| 2018/0353942 A1 | 12/2018 | Liang et al. |
| 2023/0381750 A1 | 11/2023 | Carr et al. |

FOREIGN PATENT DOCUMENTS

| | | | | |
|---|---|---|---|---|
| CN | 102083526 A | * | 6/2011 | .......... B01J 19/0093 |
| CN | 116715198 A | * | 9/2023 | ....... C01B 2203/124 |
| KR | 20140111229 A | * | 9/2014 | ............ B01J 23/755 |
| WO | WO-2023009760 A1 | | 2/2023 | |

OTHER PUBLICATIONS

"U.S. Appl. No. 18/448,326, Final Office Action mailed Jun. 14, 2024", 12 pgs.
"U.S. Appl. No. 18/448,326, Non Final Office Action mailed Feb. 26, 2024", 16 pgs.
"U.S. Appl. No. 18/448,326, Response filed Jan. 11, 2024 to Restriction Requirement mailed Nov. 13, 2023", 7 pgs.

(Continued)

*Primary Examiner* — Kaity V Chandler
(74) *Attorney, Agent, or Firm* — Schwegman Lundberg & Woessner, P.A.

(57) ABSTRACT

A catalyst may include a metal oxide substrate comprising a nickel species, wherein an exposed surface of the catalyst comprises at least some of the nickel species and the exposed surface is substantially nonporous.

29 Claims, 2 Drawing Sheets

(56) References Cited

OTHER PUBLICATIONS

"U.S. Appl. No. 18/448,326, Response filed May 28, 2024 to Non Final Office Action mailed Feb. 26, 2024", 10 pgs.
"U.S. Appl. No. 18/448,326, Restriction Requirement mailed Nov. 13, 2023", 7 pgs.
"International Application Serial No. PCT/US2022/038733, International Preliminary Report on Patentability mailed Feb. 8, 2024", 9 pgs.
"International Application Serial No. PCT/US2022/038733, International Search Report mailed Dec. 6, 2022", 4 pgs.
"International Application Serial No. PCT/US2022/038733, Invitation to Pay Additional Fees mailed Sep. 30, 2022", 2 pgs.
"International Application Serial No. PCT/US2022/038733, Written Opinion mailed Dec. 6, 2022", 7 pgs.
U.S. Appl. No. 18/448,326, Examiner Intervier Summary mailed Sep. 13, 2024, 3 pgs.
U.S. Appl. No. 18/448,326, Notice of Allowability mailed Nov. 1, 2024, 2 pgs.
U.S. Appl. No. 18/448,326, Notice of Allowance mailed Sep. 28, 2024, 9 pgs.
U.S. Appl. No. 18/448,326, Response filed Sep. 12, 2024 to Final Office Action mailed Jun. 14, 2024, 7 pgs.

* cited by examiner

SYNGAS AND METHOD OF MAKING THE SAME

BACKGROUND

Syngas, or synthesis gas, is a fuel gas mixture primarily including hydrogen, carbon monoxide, and often carbon dioxide. The name comes from its use as an intermediate in creating synthetic natural gas (SNG) and for producing ammonia or methanol.

SUMMARY OF THE INVENTION

The present disclosure presents numerous advantages and benefits, at least some of which are unexpected. For example, according to various aspects, the disclosed method of making syngas using the instant catalyst may produce a high yield of syngas. Additionally, according to various aspects, the disclosed catalyst may be capable of catalyzing the reaction to produce syngas without coking of the catalyst for a prolonged period of time. Additionally, according to various aspects, it was unexpectedly found that despite the catalyst having a reduced surface area compared to conventional catalysts that may have a higher degree of porosity, the instantly disclosed catalyst may be capable of producing a comparable of greater yield of syngas by surface area of the catalyst, by weight of the catalyst, by volume of the catalyst, or both, all while being substantially free of coke.

In some aspects, the techniques described herein relate to a catalyst for catalyzing the production of syngas from a mixture including steam and a hydrocarbon, the catalyst including: a metal oxide substrate including a nickel species, wherein an exposed surface of the catalyst includes at least some of the nickel species and the exposed surface is substantially nonporous.

BRIEF DESCRIPTION OF THE FIGURES

The drawings illustrate generally, by way of example, but not by way of limitation, various aspects of the present invention.

DETAILED DESCRIPTION OF THE INVENTION

Figure 1:
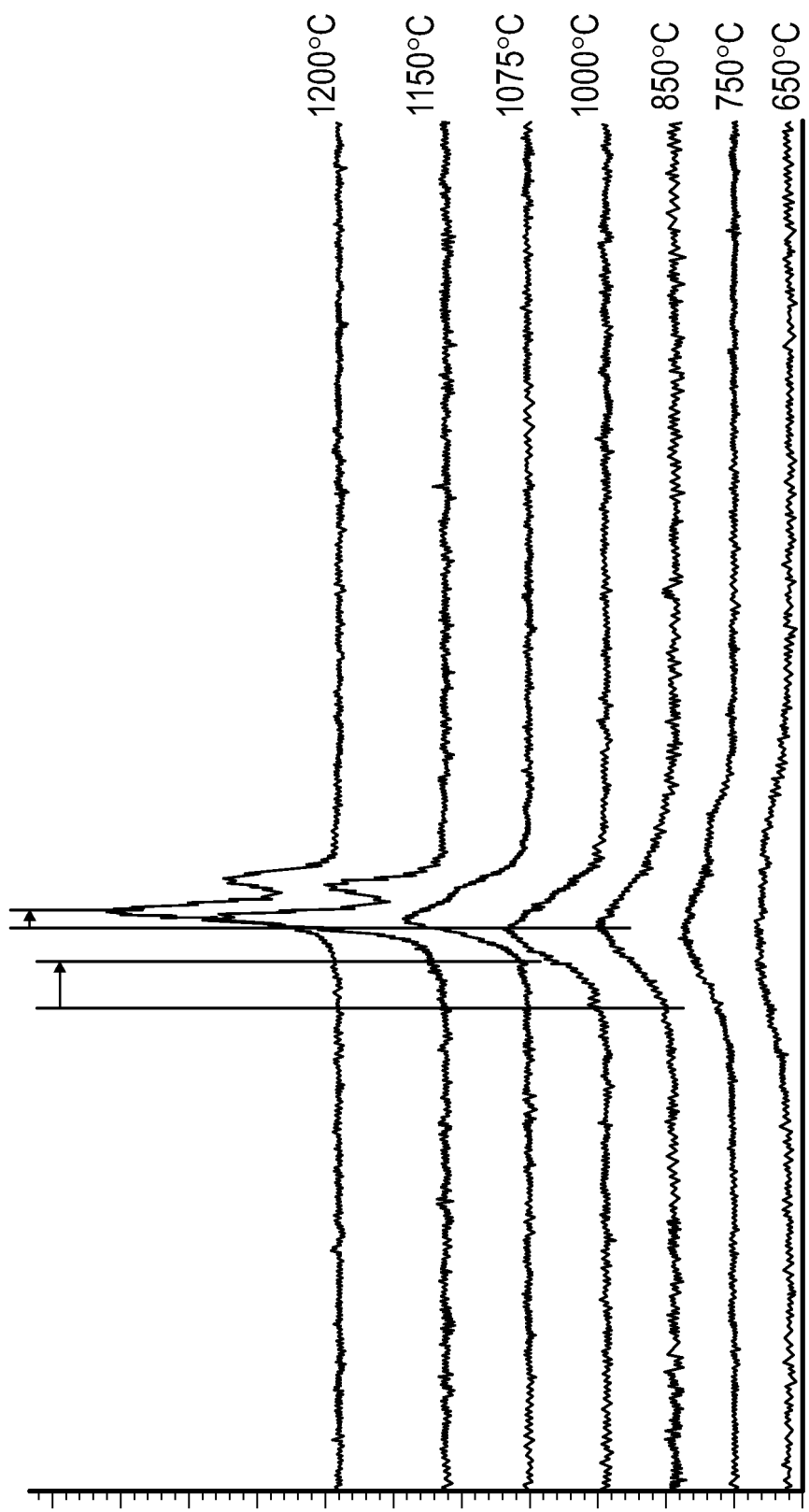
FIG. 1 is an X-Ray Diffraction plot, in accordance with various aspects.

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" should be interpreted to include not just about 0.1% to about 5%, but also the individual values (e.g., 1%, 2%, 3%, and 4%, etc.) and the sub-ranges (e.g., 0.1% to 0.5%, 1.1% to 2.2%, 3.3% to 4.4%, etc.) within the indicated range. The statement "about X to Y" has the same meaning as "about X to about Y," unless indicated otherwise. Likewise, the statement "about X, Y, or Z" has the same meaning as "about X, or about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts may be carried out in any order without departing from the principles of the invention, except when a temporal or operational sequence is explicitly recited. Furthermore, specified acts may be carried out concurrently unless explicit claim language recites that they be carried out separately. For example, a claimed act of doing X and a claimed act of doing Y can be conducted simultaneously within a single operation, or in either order (X before Y or X after Y) and the resulting process will fall within the literal scope of the claimed process.

The term "about" as used herein can allow for a degree of variability in a value or range, for example, within 10%, within 5%, or within 1% of a stated value or of a stated limit of a range and includes the exact stated value or range as well. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein may mean having none or having a trivial amount of, such that the amount of material present does not affect the primary properties of the composition including the material, by way of examples, a statement such that about 0 wt % to about 5 wt % of the composition is the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Described herein is a catalytic alloy catalyst (alternatively a catalytic alloy, a catalyst, or in crystalline or partially crystalline form) and method for producing syngas using the catalyst. Syngas, or synthesis gas, is a gas mixture primarily of hydrogen, carbon monoxide, and potentially some carbon dioxide. Syngas may be a product of coal gasification and has been used for electricity generation. Syngas is combustible and may also be used as a fuel for internal combustion engines.

Syngas may be produced from many sources, including natural gas, coal, biomass, or virtually any hydrocarbon feedstock, by reaction with steam (e.g., steam reforming), carbon dioxide (e.g., dry reforming) or oxygen (e.g., partial oxidation). Syngas may be an intermediate resource for production of hydrogen, ammonia, acetyls, methanol, carbon products, and synthetic hydrocarbon fuels. It is also used as an intermediate in producing synthetic hydrocarbons for use as a fuel or lubricant via the Fischer-Tropsch process.

The instant disclosure is drawn towards a steam reforming process as opposed to a dry reforming process for forming syngas. Steam reforming or steam methane reforming (SMR) is a method for producing syngas (hydrogen and carbon monoxide) by reaction of hydrocarbons and water. Commonly natural gas (mainly methane) is the primary feedstock (along with water). The main purpose of SMR technology is hydrogen production. The steam reforming reaction may be represented as shown below:

$$H_2O + CH_4 \rightleftharpoons 3H_2 + CO$$

The reaction is strongly endothermic ($\Delta HSR=206$ kJ/mol). Hydrogen produced by steam reforming is termed "grey hydrogen" when the waste carbon dioxide is released to the atmosphere and "blue hydrogen" when the carbon dioxide is (mostly) captured and stored geologically. Zero carbon "green" hydrogen is produced by thermochemical water splitting, using solar, wind, geothermal, or other low- or zero-carbon electricity or waste heat, or electrolysis, also using low- or zero-carbon electricity. Zero carbon emissions "turquoise" hydrogen is produced by one-step methane pyrolysis of natural gas yielding hydrogen and solid carbon.

Steam reforming of natural gas produces most of the world's hydrogen. Hydrogen is used in the industrial synthesis of ammonia, fuels, and other chemicals. The method according to the instant disclosure includes treating a catalyst with a C1-C4 hydrocarbon such as methane and steam to produce carbon monoxide and hydrogen (syngas). The molar ratio of the steam to hydrocarbon content is in a range of from about 3:1 to about 1:1, about 2.5:1 to about 1:1, about 1:5 to about 1:1, or about 1:2 to about 1:1. In some examples the molar ratio of the steam to hydrocarbon content does not exceed 2.5:1.

According to the instantly disclosed methods, no carbon dioxide is purposefully introduced to the catalyst as a feed gas. That is the catalyst is only introduced to carbon dioxide present in the ambient atmosphere, no additional carbon dioxide (beyond a reaction byproduct or ambient source, if any) is put in contact with the catalyst. Not adding carbon dioxide makes the process more environmentally friendly for at least two reasons. First, less carbon dioxide is required for use, so the use of greenhouse gases is reduced. Second, without purposefully adding carbon dioxide there is less and, in some cases, no leftover carbon dioxide following the reaction.

The molar ratio of hydrogen and carbon monoxide produced is in a range of from about 4:1 to about 1:4, about 3:1 to about 1:3, about 2:1 to about 1:2, or about 1:1. The molar ratio may be constant during the production or it may be varied depending on the amount of reactants, rate of delivery of the reactants, or other factors. According to various aspects, the syngas produced are not subjected to any post-production processing to refine it. Typically, less than 4 wt % methane, less than 2 wt % methane, or 0 wt % methane is left over following the production of syngas. Examples of post-production processing can include a "water-gas shift" to convert carbon monoxide and water to hydrogen and carbon dioxide and a resulting change or tailoring of the aforementioned molar ratio of hydrogen to carbon monoxide. Alternatively, post-production processing can include use of a Vacuum Pressure Swing Adsorber (VPSA), a cryogenic separation process, membrane unit separation process, Pressure Swing Adsorber (PSA), or a combination thereof to purify the gas or change the ratio of gas for a downstream process.

A unique and advantageous aspect of the disclosed catalyst is that it has a very high conversion efficiency of any carbon dioxide reactant (e.g., atmospheric carbon dioxide) that may be present to form syngas. Moreover, owing to the extreme efficiency of the catalyst, it is possible to greatly reduce the amount of energy used to generate steam, for example less than about 50% to 75% of the energy used to generate steam for a corresponding catalyst. To the extent that there is any leftover carbon dioxide or heat, the excess may be routed to another process or reused to generate more syngas.

Additionally, very little hydrocarbon is left over following the production of syngas. For example, less than about 2 wt % to 4 wt % hydrocarbon (e.g., methane) is left following the production of syngas or even no hydrocarbon is leftover in comparison to conventional catalysts leaving greater than 3% hydrocarbons.

The hydrocarbon used as a reactant may be obtained from many different sources such as a renewable natural gas, a landfill emission, an oil well emission, a coal mine emission, or a mixture thereof.

The catalyst that is used for the production of syngas from steam and methane is a catalytic alloy catalyst. A catalytic alloy catalyst includes components that coexist as a lattice that includes a degree of crystallinity while also including at least some amorphous character. As a non-limiting example, the amorphous portion of the catalyst may be in range of from about 0.5 wt % to about 10 wt % of the catalyst, about 2 wt % to about 7 wt %, about 3 wt % to about 5 wt %, less than, equal to, or greater than about 0.5 wt %, 1, 1.5, 2, 2.5, 3, 3.5, 4, 4.5, 5, 5.5, 6, 6.5, 7, 7.5, 8, 8.5, 9, 9.5, or about 10 wt %. The mixing of components that form the catalyst can be accomplished, for example, by combining two normally solid materials when they have been melted into liquids at high temperatures and then cooling the resulting product to form a new solid composed of both materials (or a solid alloy) or by depositing vapors of the starting materials onto substrates to form thin films of the mixed materials. The nature of the mixed solid or alloy depends on the chemical properties of the components and the mixture's (or alloy's) crystalline structure, which determine how the atoms (and/or molecules) fit together in the mixed crystal lattice (possibly including any amorphous portions thereof). The new lattice may be substitutional, in which the atoms of one starting crystal replace those of the other, or interstitial, in which the atoms occupy positions normally vacant in the lattice containing only one material. The substances may present in an organized or consistent structure over a partial or even complete range of relative concentrations, producing a crystal (or alloy) whose properties vary (possibly continuously) over the range.

The materials that form the alloy catalyst can be chosen from materials that are capable of forming an alloy catalyst such as at least two materials having atomic (and/or molecular or ionic) radii that are within about 15% of each other; substantially the same or complementary crystalline structure; substantially the same electronegativity; substantially similar valency; or a combination thereof. The materials may generally be chosen from metal oxides and metal oxide precursors. In some specific examples, the catalyst may include a substantially nonporous metal oxide substrate and a nickel species uniformly (in crystalline regions) or otherwise (in amorphous regions) dispersed in (or mixed or "alloyed" with) the metal oxide substrate and at least partially embedded therein. Examples of metal oxides for the substrate may include magnesium oxide (MgO), nickel oxide (NiO), iron oxide (FeO), cobalt oxide (CoO), manganese oxide (MnO), or a mixture thereof. The mixture may include any combination or sub-combination of the metal oxides. For example, the mixture may be a binary mixture, tertiary mixture, quaternary mixture, or the like. In any mixture, the concentration of each of the metal oxides may be substantially the same, or alternatively, the concentration of at least one metal oxide may be different from the concentration of at least one other metal oxide.

The nonporous nature of the catalyst may be understood to refer to a "surface porosity" meaning that the catalyst may be free of pores that extend from the surface of the catalyst towards the interior of the catalyst. Such nonporous nature (or limited porosity when compared to conventional catalysts) of the catalyst may further be characterized by a lack of "internal porosity" meaning that the catalyst may be free of pores that extend through at least a portion of the catalyst. In some examples, the nonporous nature of the catalyst may refer to both the surface porosity and the internal porosity. Surface porosity, internal porosity, or both may be characterized by having a minimal number of pores or by individual pores, which may be present, having a small major dimension. A "major dimension" refers to the largest of the length, width, or thickness of an object or vacancy. For example, any surface pores or through pores may have a width of less than 50 nm, less than 40 nm, less than 30 nm, less than 20 nm, less than 10 nm, in a range of from about 10 nm to about 50 nm, about 10 nm to about 30 nm, or about 10 nm to about 15 nm. According to various aspects, a pore may account for less than about 20% of the total surface area of the catalyst, less than about 10% of the total surface area of the catalyst, less than about 5% of the total surface area of the catalyst, less than about 1% of the total surface area of the catalyst, or 0% of the total surface area of the catalyst. For example, a pore volume of the catalyst may be less than about 0.5 cm$^3$/g, less than 0.3 cm$^3$/g, less than 0.1 cm$^3$/g, or 0 cm$^3$/g.

The nonporous nature of the catalyst may help to prevent "coking" of the catalyst. Coking is one of several mechanisms that may be responsible for deactivation of a conventional catalyst used for reformation of carbon dioxide. Coking refers to the deposition of coke (a hard, strong, porous material of high carbon content) on the catalyst. If the catalyst has porosity, the coke may penetrate the pores and prevent reactants from interacting with active sites on the catalyst. However, the instant catalyst may be nonporous and has a somewhat smooth-glassy surface, thus preventing or reducing coke from being deposited (or reducing its deposition) in any pores or on the surface of the catalyst.

Conventional catalyst design principles counsel against designing the catalyst to have such a low porosity. This is because it is thought (and in some cases has been demonstrated) that increasing porosity allows for a greater surface area to distribute active on and, therefore, produce more product. However, the inventors have surprisingly and unexpectedly found that the instant catalyst may be capable of providing a very high yield of syngas despite having a comparatively smaller active surface area than a conventional catalyst having a higher degree of porosity. Although the instant catalyst does not have an increased surface area resulting from porosity, in some examples the surface area of the catalyst may be increased by including a series of surface structures whether grooves, undulations, or peaks-and valleys on the surface of the catalyst. Unlike pores, which may be characterized as penetrating the surface of the catalyst, the surface structures do not penetrate the surface of the catalyst. For example, a bottom or lowest portion of the surface structure is still characterized as the surface of the catalyst.

The metal oxide substrate can be generally a continuous structure. For example, the metal oxide substrate may give the catalyst its overall structure. The overall structure of the catalyst substrate may be substantially spherical, substantially cylindrical, substantially flat, or it may have an undulating profile. The substrate on the surface of which the catalyst is present may be solid. Alternatively, the catalyst may have at least one through pore. For example, the catalyst may have a "wagon wheel" structure in which the catalyst is circular with a number of through pores extending from the first end of the catalyst to a second end of the catalyst. The catalyst may have any number of through pores, for example the catalyst may have a single through pore or a plurality of through pores. In some examples, it may be possible for the catalyst to include a number of indentations that penetrate partially through the thickness of the catalyst, which may be helpful to increase the surface area as well. The through pore(s) may extend substantially along the largest dimension of the catalyst or a smaller dimension. A largest dimension of the catalyst may be in a range of about 100 µm to about 52 mm, about 1 mm to about 10 mm, in a range of about 4 mm to about 6 mm, or less than, equal to, or greater than about 100 µm, 200 µm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 16.5 mm, 17 mm, 17.5 mm, 18 mm, 18.5 mm, 19 mm, 19.5 mm, or about 20 mm. The largest dimension can refer to a length, width, or diameter of the catalyst.

The nickel species of the catalyst may include elemental nickel, nickel oxide, or a mixture thereof. In total, the nickel species may be about 0.2 wt % to about 30 wt % of the catalyst, about 14 wt % to about 25 wt % of the catalyst, or less than, equal to, or greater than about 0.2 wt % of the catalyst, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30 wt % of the catalyst. The nickel species may be homogenously distributed about the metal oxide substrate. In most examples, the nickel species includes nickel oxide as opposed to elemental nickel.

At least a portion of the nickel species may be exposed on a surface of the metal oxide substrate. The portion of the nickel species that may be exposed on the surface of the metal oxide substrate is available to be contacted directly with the reactants and catalyze the reaction to produce syngas. The exposed portion of the nickel species is bound to the metal oxide substrate. Thus, the exposed portion of the nickel species may be free of unbound or free nickel or nickel oxide.

The nickel of the nickel species that is exposed on a surface of the metal oxide substrate may be primarily nickel oxide as opposed to elemental nickel. For example, the nickel of the nickel species that is exposed on a surface of the metal oxide substrate may be from about 80 wt % to about 100 wt % nickel oxide, about 95 wt % to about 100 wt % nickel oxide, less than, equal to, or greater than about 80 wt %, 85, 90, 95, or 100 wt % nickel oxide. In total, the amount of the nickel species exposed on a surface of the metal oxide substrate may be in a range of from about 10 wt % to about 30 wt % of the nickel species, about 14 wt % to about 18 wt % of the nickel species, less than, equal to, or greater than about 10 wt %, 11, 12, 13, 14, 15, 16, 17, 18, 19, 20, 21, 22, 23, 24, 25, 26, 27, 28, 29, or 30 wt %. The exposed nickel species may account for about 10% to about 90% of the total surface area of the catalyst, about 20% to about 80% of the total surface area of the catalyst, about 30% to about 70% of the total surface area of the catalyst, about 40% to about 60% of the total surface area of the catalyst, less than, equal to, or greater than about 10% of the total surface area of the catalyst, 15, 20, 25, 30, 35, 40, 45, 50, 55, 60, 65, 70, 75, 80, 85, or about 90% of the total surface area of the catalyst. As an example, a catalytic surface area may range from about 0.05 $m^2/g$ to about 0.5 $m^2/g$. The pore volume of the catalyst may range from about 0.0005 $cm^3/g$ to about 0.05 $cm^3/g$.

As described herein, the nickel species may be generally free of unbound or free elemental nickel as it is part of the nickel in the crystalline lattice. However, to mitigate the risk of free elemental nickel being present, the catalyst may include potassium ions distributed in or at the surface of the catalyst. Where present, the potassium ions range from about 0.2 wt % to about 5 wt % of the catalyst material on the substrate, about 1 wt % to about 2 wt % of the catalyst material on the substrate, less than, equal to, or greater than about 0.2 wt % of the catalyst material on the substrate, 0.5, 1, 1.5, 2, 2.5, 3, 3.5, 4, 4.5, or about 5 wt % of the catalyst. The potassium ions may be supplied as potassium nitrate, potassium acetate, potassium carbonate, or a mixture thereof. In various aspects, the catalyst is free of free elemental nickel. However, if free elemental nickel is present, it is expected to be less than about 2 wt % free elemental nickel in the nickel species, less than about 0.5 wt % free elemental nickel in the nickel species, or does not contain free of free elemental nickel in the nickel species.

In use, the catalyst may be contacted with a feed stream including, in many examples, methane and steam to produce carbon monoxide and hydrogen (syngas).

The catalyst may be able to produce syngas from a wide array of steam and hydrocarbon sources. For example, the steam and hydrocarbon source may be a feed stream of industrial waste (e.g., a power plant exhaust source, fermentation byproduct or primary product gas, landfill methane reclamation, bio-digestor methane production, steel furnace exhaust gas, cement plant exhaust gas, ammonia byproducts, methanol tail gas, flare gas, or the like) an air captured carbon source, or a mixture thereof. In some examples, the feed stream may be captured and supplied to the catalyst. In some other examples, the source of the feed stream may be directly coupled (e.g., co-located) with an apparatus for the production of syngas, such that the feed stream is directly put into contact with the catalyst. Thus, a producer of an environmentally unfriendly gas may recoup environmental, economic, and/or social benefits from an off-gas use.

Before the catalyst is contacted with the feed stream including steam and hydrocarbon, the catalyst may be activated. Activating the catalyst may include contacting the catalyst with a mixture of hydrogen gas and nitrogen gas for a time in a range of from about 0.1 hour to about 6 hours, about 2 hours to about 5 hours, less than, equal to, or greater than about 0.11 hour, 0.5, 1, 2, 3, 4, 5, or 6 hours. Activation may occur at a temperature in a range of from about 400° C. to about 600° C., about 450° C. to about 500° C., less than, equal to, or greater than about 400° C., 410, 420, 430, 440, 450, 500, 550, or about 600° C. A ratio of hydrogen gas to nitrogen gas used to activate the catalyst may be in a range of from about 90:10 to about 70:30 or about 85:15 to about 75:25.

The hydrogen and carbon monoxide of the syngas may be produced in a molar ratio of about 3:1, 2:1, 1:1, 1:2, or about 1:3. These ratios exclude the presence of any other gas present besides carbon monoxide and hydrogen. In the reaction at least 70 wt % of the steam and hydrocarbon that contacts the catalyst are converted to carbon monoxide and hydrogen per turn, at least 90 wt % of the steam and hydrocarbon that interact with the catalyst are converted to carbon monoxide and hydrogen per turn, about 70 wt % to about 99 wt %, about 90 wt % to about 99 wt %, or about 95 wt % to about 98 wt %. Thus, the catalyst of the instant disclosure may be capable of producing commercially viable yields of syngas. In addition to the yield, the kinetics of the catalyst are very fast. For example, the catalyst may have a gas hourly space velocity of about 1000 to about 20000, about 3000 to about 5000, less than, equal to, or greater than about 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, or about 20000. As understood a "turn" (or pass) refers to a contacting event of the steam and methane with the catalyst to form syngas.

The kinetics and yield of the reaction may be impacted by the pressure at which the steam and hydrocarbon are contacted with the catalyst. For example, steam and hydrocarbon may be contacted with the catalyst at a pressure in a range of from about 25 KPa to about 3500 KPa, about 30 KPa to about 2100 KPa, less than equal to or greater than about 25 KPa, 50, 100, 150, 200, 250, 300, 350, 400, 450, 500, 550, 600, 650, 700, 750, 800, 850, 900, 950, 1000, 1500, 2000, 2100, 2200, 2300, 2400, 2500, 2600, 2700, 2800, 2900, 3000, 3100, 3200, 3300, 3400, or about 3500 KPa.

The kinetics and yield of the reaction may also be impacted by the flow rate of the feed stream. In some examples the flow rate of the feed stream may be measured in terms of a gas hourly space velocity (GHSV) that may be in a range of from about 500 $h^{-1}$ to about 11000 $h^{-1}$ about 1000 $h^{-1}$ to about 10000 $h^{-1}$, less than, equal to, or greater than about 500 $h^{-1}$, 1000, 1500, 2000, 25000, 3000, 3500, 4000, 4500, 5000, 5500, 6000, 6500, 7000, 7500, 8000, 8500, 9000, 9500, 10000, 10500, or 11000 $h^{-1}$.

Additionally, the kinetics and yield of the reaction may be impacted by the temperature at which the reaction is performed. In some examples, the reaction may be performed at a temperature in a range of from about 530° C. to about 2000° C., about 276° C. to about 1371° C., about 815° C. to about 1093° C., less than, equal to, or greater than about 530° C., 540, 550, 560, 570, 580, 590, 600, 610, 620, 630, 640, 650, 660, 670, 680, 690, 700, 710, 720, 730, 740, 750, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1780, 1790, 1800, 1810, 1820, 1830, 1840, 1850, 1860, 1870, 1880, 1890, 1900, 1910, 1920, 1930, 1940, 1950, 1960, 1970, 1980, 1990, or about 2000° C. In some examples, the heat required to reach the temperature will be provided from the feed stream. Additionally, or in other examples the catalyst may be located in a vessel, which may be heated to achieve the desired reaction temperature. The ability to run the reaction at these elevated temperatures allows for faster production of syngas and is made possible by the catalyst being sintered and therefore able to be exposed to high temperatures without substantially decomposing.

Importantly, and contrary to conventional catalysts for the production of syngas, the instantly disclosed catalyst may be substantially free of coking during performance of the method. For example, the catalyst may be free of coking for a period of time of at least 1 week, at least one month, at least 6 months, at least 1 year, at least 2, years or at least 3 years. By "free of coking" it is meant that the catalyst may continuously catalyze the syngas production reaction without about 20% to about 100% loss of catalytic activity, about 40% to about 80% loss of catalytic activity, less than, equal to, or greater than about 30% loss of catalytic activity, 35, 40, 45, 50, 55, 60, 65, 70, 75, 80, 85, 90, 95, or about 100% loss of catalytic activity.

Although the catalyst of the instant disclosure shows good anti-coking properties, the catalyst may be steam treated, if desired, to remove any amount of coke that may be present. The steam delivered is in addition to any steam used as a reactant. To steam treat the catalyst, the flow of the feed stream is cut off, and steam at a temperature in a range of from about 150° C. to about 1000° C., about 200° C. to about 260° C., or less than, equal to, or greater than about 150° C., 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000° C., is fed to the catalyst. Steam may be fed to the catalyst for a suitable amount of time, such as an amount of time in a range of from about 0.2 hours to about 20 hours, about 2 hours to about 15 hours, less than, equal to, or greater than about 0.2 hours, 0.5, 1, 2, 3, 4, 5, 6, 7, 8, 9, 10, 11, 12, 13, 14, 15, 16, 17, 18, 19, or about 20 hours. The performance of the catalyst may be continually monitored and if the performance drops below a certain threshold the syngas production may be stopped and the catalyst may be steam treated to remove any coke that may be present. Importantly, if the catalyst is treated with steam, the catalyst may be reused to product syngas, unlike most conventional catalysts. Coke may also be removed by exposure to carbon dioxide and water.

The catalyst s described herein may be formed according to any suitable method. An example of a suitable method may include mixing a nickel solution into a metal oxide powder to form a mixed powder.

Alternatively, the mixed powder may be formed by co-precipitation of a nickel solution and a single metal or multiple metals solution selected from the group of cobalt, iron, manganese and magnesium. The nickel solution may include nickel(II) nitrate hexahydrate, nickel(II)di-acetate, nickel(II)carbonate, or a combination thereof. In some examples, nickel(II) nitrate hexahydrate may be particularly suited for the method. The metal oxide powder may include any of the metal oxides described herein. In some examples, magnesium oxide may be particularly well suited to form a catalytic alloy catalyst along with nickel(II) hexahydrate. In some examples, it was found that controlling the $d_{50}$ of the metal oxide s present helped to form the catalytic alloy catalyst. For example, suitable $d_{50}$ values for the metal oxide may be in a range of from about 2 µm to about 120 µm, about 5 µm to about 100 µm, less than, equal to, or greater than about 2 µm, 5, 10, 15, 20, 25, 30, 35, 40, 45, 50, 55, 60, 65, 70, 75, 80, 85, 90, 95, 100, 105, 110, 115, or about 120 µm. The nickel solution and the metal oxide are readily soluble in each other, which facilitates even mixing.

After the mixed powder is formed, the mixed powder may be dried. The mixed powder may be air dried or heated. Following drying, the mixed powder becomes a dried paste. The dried paste may be then crushed to form a dried powder. Crushing may be accomplished using ball-milling, granulation, or a combination thereof. Crushing may occur for a range of time of about 0.5 hours to about 5 hours, about 2 hours to about 4 hours, less than, equal to, or greater than about 0.5 hours, 1 hour, 2 hours, 3 hours, 4 hours, or 5 hours. However, if the mixed powder is spray dried, there is no need for crushing.

The dried powder may then be calcined. Calcining the dried powder converts the nickel solution to nickel oxide. Calcining may occur at a temperature in a range of from about 400° C. to about 2000° C., about 500° C. to about 1500° C., about 950° C. to about 1050° C., less than, equal to, or greater than about 400° C., 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000° C. A temperature of 950° C. to about 1050° C. has been found to be particularly effective. Calcining may occur for a time in a range of from about 0.5 hours to about 12 hours, about 1 hour to about 3 hours, less than, equal to, or greater than about 0.5 hours, 1, 1.5, 2, 2.5, 3, 3.5, 4, 4.5, 5, 5.5, 6, 6.5, 7, 7.5, 8, 8.5, 9, 9.5, 10, 10.5, 11, 11.5, or 12 hours.

The catalyst can also be prepared by mixing a nickel solution into a metal oxide powder with incipient wetness impregnation, to form a paste. Alternatively, the nickel solution and metal oxide powder may be dry mixed to make a slurry. The paste or slurry may be dried to produce a dispersed powder. The dried powder may be calcined as described above to form the catalyst. As generally understood, a paste refers to a thickened mixture of insoluble matter and a slurry refers to a mixture of dense solids suspended in liquid.

The catalyst has been described as a solid. However, it is also possible and within the scope of the instant disclosure for the catalytic material of the catalyst to be a coating present on a substrate that is substantially inert to methane, carbon dioxide, carbon monoxide, and hydrogen. Examples of such a substrate include a silica or a ceramic. The substrate may take on any suitable shape such as a sphere, a rod, a latticed structure, a porous structure, or the like. The average thickness of the coating may be in a range of from about 0.1 mm to about 2.5 mm, about 0.15 mm to about 2 mm, less than, equal to, or greater than about 0.1 mm, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, or about 2.5 mm. The substrate may be coated with the catalyst to any suitable degree. For example, about 30% to about 100% of the total surface area of the substrate may be coated with the catalyst, about 40% to about 90% of the total surface area of the substrate may be coated with the catalyst, about 50% to about 80% of the total surface area of the substrate may be coated with the catalyst, less than, equal to, or greater than about 30% of the total surface area of the substrate, 35, 40, 45, 50, 55, 60, 65, 70, 75, 80, 85, 90, 95, or about 100% of the total surface area of the substrate. Manufacturing the catalyst coated substrate may largely follow the protocols describe herein above with the additionally step of applying the mixed powder to the substrate material and drying the mixed powder thereon ahead of calcining the dried powder to form the catalyst coating on the substrate.

To produce syngas at a commercially desirable level, the catalyst may be incorporated into an assembly. In some examples, the catalyst may be retrofit into an existing assembly. For example, the catalyst may be located within a reaction vessel. According to various examples, a reaction vessel may include a tube. The tube may be configured to have a generally cylindrical profile with an inlet and an outlet. Without being so limited, the inlet may be located proximate to or at the bottom of the tube and the outlet may be located proximate to or at the top of the tube. The tube may be formed from a metal such as a nickel alloy and the catalyst may be distributed about the tube. As an additional example, the inlet may be located proximate to or at the top of the tube and the outlet may be located proximate to or at the bottom of the tube.

The reaction vessel may take on other shapes and configurations as well. For example, in some cases a heat source such as a furnace may be placed in thermal communication with the reaction vessel. The reaction vessel may include a feedback loop to direct any carbon dioxide produced by the heat source to the reaction vessel to participate in the instantly described method for producing syngas. Routing carbon dioxide back to the reaction vessel may significantly reduce the carbon dioxide emissions of a plant using the instantly disclosed method. In some examples, the carbon dioxide emissions may be virtually non-existent.

Heat generated from the reactor may be used to run an amine recovery operation of any carbon dioxide emission present in the flue gas of the reactor. Additionally, any flue gas from the reaction may be captured or used as reactant such that the overall process is a zero emissions process.

The catalyst may be fixed within the reaction vessel. For example, the catalyst may be adhered to an inner surface of the reaction vessel. As another example, a retention device may be located within the reaction vessel and the catalyst may be retained by the retention device. The reaction assembly may include any plural number of catalyst (or units of substrate coated with catalyst). The optimum number of catalysts s in the reaction assembly may be determined with a loading test. This may involve checking for void space in the catalyst retention device and/or reaction assembly and packing density in the assembly to optimize the amount of catalyst s. The composition (e.g., chemical composition) or physical characteristics (e.g., catalyst size) of the individual catalyst s may be the same or different. The distribution of the catalyst s may be an even distribution (e.g., an equal amount of catalyst s across the reaction vessel) or an uneven distribution (e.g., a gradient of amounts of catalyst s or a large or small concentration of catalyst s at a first location relative to a second location). An even distribution of the catalyst s may be helpful to increase the possibility that as much feed gas as possible may contact the catalyst s. If the catalyst s are only placed at one location, for example, there may be a risk that some feed gas may go past the catalyst s without reacting, thereby decreasing the yield of syngas relative to the amount of feed gas supplied.

The metal of the reaction vessel may be a metal showing high thermal resistivity as well as inertness to the feed gas and syngas. The high thermal resistivity may be helpful to maintain the integrity of the reaction vessel when exposed to the potentially high temperatures of the feed gas, the source of heat required to bring conditions inside the reaction vessel to a temperature suitable for conducting the reaction, as described herein, or both.

The syngas produced according to the instantly described methods may be used in many different industrial applications. For example, the syngas produced may be utilized as a feedstock that may be used to form a carbon containing substance such a paraffinic base oil, a paraffinic wax, a solvent, a fuel, ammonia, methanol, ethanol, propanol, butanol, pentanol, acetic acid, dimethoxyethane, purified $H_2$, purified CO, a blend of hydrogen and carbon monoxide, amide, dimethylcarbonate, ethylmethylcarbonate, oxo-alcohols, graphene, carbon fibers, carbon nanotubes, carbon black, graphite, or a mixture thereof. In some examples, the syngas provided may be directly fed into the industrial application.

Additional hydrogen may be formed from the carbon monoxide in the syngas. The additional hydrogen may be formed, for example, through what is called the water-gas-shift reaction represented below:

$$CO + H_2O \rightleftharpoons CO_2 + H_2 \text{ --41 kJ/mol}$$

The carbon monoxide used for the hydrogen synthesis may be provided from the syngas. In the process carbon monoxide may be used as a reductor to shift syngas entirely to $H_2$ (and $CO_2$). The high temperature water gas shift uses iron oxide as a catalyst and proceeds at a temperature in a range of from about 300° C. to about 500° C. A low-temperature process (e.g., around 200° C.) based on a copper-zinc oxide catalyst may drive the equilibrium further towards hydrogen, but requires clean feed gas. Thus, the hydrogen that may be produced by forming syngas may be increased through these reactions.

Additionally, any hydrogen gas or carbon monoxide gas may be purified. For example, the hydrogen gas or carbon monoxide gas may be purified using a pressure adsorption unit. This may produce hydrogen gas and carbon monoxide gas that may each have a purity of 90% to 99.9%.

Methanol may be another product that may be formed from syngas produced according to the instant disclosure. Methanol may be a desirable product because it is a versatile intermediate for the chemical industry, but may also serve as a fuel. Dimethyl ether (a derivative of methanol) may also be made from syngas and may be applicable as bottle gas for cooking (e.g., camping gas) or as a substitute for diesel fuel. Methanol is also used in the transesterification of vegetable oils to produce biodiesel. Methanol may be produced catalytically.

Examples of reactions used to produce methanol from syngas include the following:

$$CO_2 + 3H_2 \rightleftharpoons CH_3OH + H_2O \text{ -47 kJ/mol}$$

The above reaction may also be combined with the water-gas shift reaction described above, as shown below:

$$CO + 2H_2 \rightleftharpoons CH_3OH \text{ -91 kJ/mol}$$

In examples where the syngas may be used to produce ethanol, carbon dioxide may be present in the mixture of products. Specifically, the carbon dioxide may be present in an amount as high as 50 wt % (or as high as 30 wt %, 35 wt %, 40 wt % or 45 wt %) of the total amount of products. The carbon dioxide may be captured and used as a reactant for syngas production. The exact amount of carbon dioxide may depend on whether it is a non-converted by-product, or the final hydrocarbon content of a produced product.

Additionally, hydrocarbons used to form the basis of gasoline, diesel, jet fuel, and chemicals such as olefins and waxes may be synthesized using the syngas produced according to the instant disclosure. The hydrocarbons may be formed using Fischer-Tropsch Synthesis (FTS). FTS may be used in gas-to-liquids (GTL) plants. The product distribution resulting from an FTS process may include more than liquids and hydrocarbons alone, and may include methane and alkanes, as well as hydrocarbons having the formula $C_nH_{2n+2}$ (where n is in a range of from 1 to 100), alkenes or olefins (having the formula $C_nH_{2n}$ where n is greater than or equal to 2), and to a lesser extent oxygenated products such as alcohols. Catalysts for the Fischer-Tropsch Synthesis include those based on cobalt or iron. According to various aspects, the iron-based catalyst may be an iron carbide under reaction conditions, whereas a cobalt-based catalyst may be in the metallic state. Reaction conditions include temperatures in a range of from about 200° C. to 350° C. and pressures in a range of from about 20 and 50 bar.

Whichever product is formed from the syngas according to the instant disclosure, the product may include a high amount (by wt %) of carbon that is produced from the syngas. For example, a product formed using the syngas according to the instant disclosure may be in a range of from about 40 wt % to about 100 wt % carbon produced from the syngas of the instant disclosure, about 50 wt % to about 100 wt %, about 70 wt % to about 100 wt %, less than, equal to, or greater than about 40 wt %, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or about 100 wt %.

In some examples, a high proportion of the carbon produced by the instantly described methods of making syngas may be originated from a source of carbon dioxide emissions. For example, about 40 wt % to about 80 wt % of the carbon produced may be from a source of carbon dioxide emission (e.g., a co-product or by-product), or about 70 wt % to about 80 wt % of the carbon produced may be from a source of carbon dioxide emission, less than, equal to, or greater than about 40 wt %, 45, 50, 55, 60, 65, 70, 75, or about 80 wt %.

In some additional examples an even higher proportion of the carbon produced in manufacturing syngas may be obtained. For example, if any carbon dioxide used to make syngas is combined with a biogas for the source of methane, it is possible for about 90 wt % to about 100 wt % of carbon to be produced from greenhouse gas emissions and or renewable sources, 95 wt % to about 100 wt %, less than, equal to, or greater than about 90 wt %, 91, 92, 93, 94, 95, 96, 97, 98, 99, or about 100 wt %.

Additionally, because the syngas can be produced by a method that consumes greenhouse gases such as carbon dioxide and methane, a product formed from the syngas may have a low carbon score, may be carbon neutral, or may have a negative carbon score. The carbon score may be determined by quantifying the amount of greenhouse gas that is removed from the atmosphere in the process of making the product. For example, a carbon neutral product refers to a product that has a manufacturing process resulting in the net effect of not adding greenhouse gases to the atmosphere. As a further example, a carbon negative product refers to a product that has a manufacturing process that results in a net effect of removing greenhouse gases from the atmosphere.

In some further examples the syngas process described herein may be useful to economically produce blue hydrogen. Blue hydrogen is understood to refer to hydrogen formed when a natural gas is split into hydrogen and carbon dioxide and where the carbon dioxide is captured and not released to the atmosphere. Conventional blue hydrogen production may be environmentally and/or economically undesirable because of the carbon dioxide that is formed owing to the emission of the carbon dioxide to the atmosphere or the requirements of storing the carbon dioxide so that it is not emitted into the atmosphere. However, using the syngas production method described herein, carbon dioxide produced to form blue hydrogen may be fed into the syngas production method as a feedstock to react with methane to form syngas.

In some further examples, a plant or device associated with producing the instantly disclosed syngas may be co-located with a plant or device for making any product that uses or may use syngas as an at least partially feedstock. That is syngas produced may be directly fed into a process for making a product.

EXAMPLES

Various aspects of the present invention may be better understood by reference to the following Examples which are offered by way of illustration. The present invention is not limited to the Examples given herein.

Example 1—Catalyst Preparation

Magnesium Oxide (MgO) powder was obtained and the loss on ignition (LOI) and water pickup of the MgO powder was determined. LOI was less than 5% and water pickup ranged from 10% to 75%. An amount of nickel nitrate hexa-hydrate ("NNHH") needed to reach about 15 wt % nickel based on the total dry weight of the MgO powder was added. The NNHH was then impregnated, according to an incipient wetness (IW) technique, into the MgO powder to form an impregnated powder. The impregnated powder was dried at a temperature in a range of from 90° C. to 100° C. in a rotary evaporator (rotavap) until a dry free flowing material was obtained. The obtained powder was calcined in air at 600° C. for 2 hrs. An acceptable aid (e.g., an organic lubricant such as Abril 1071 (a lubricant available from Abril Industrial Waxes limited) was added to the obtained powder to produce a suitable amount of s (each being about 2.5±0.5 mm diameter, and length such that an aspect ratio about is 1:1). The s were then calcined at 1000° C. for 2 hrs. to obtain the catalyst.

Example 2—Catalyst Structure

The state of the catalyst formed according to Example 1 was confirmed using X-Ray Diffraction (XRD), results are shown in FIG. 1. Formation of the Ni/Mg catalytic alloy was detected at about 94 degrees (2-theta)(2Θ) in the X-Ray diffractogram (spectra) of the catalyst. Crystallinity (ordered patterns of individual atoms and/or molecules) of the catalyst increased with increased calcination temperature (from 600° C. to 1,200° C.) which led to progressive sharpening of the XRD peak. The catalyst was attained through a mixture of predominantly crystalline phase, but a minor amount of amorphous phase was also needed to retain external surface area for catalytic activity. A 100% crystalline material, as exemplified by the XRD spectra was obtained at 1,150° C. and 1,200° C. calcination, has zero catalytic surface area and exhibits very little catalytic activity. The formation of the "satellite peak" at the aforementioned two temperatures was a result of the highly crystalline reflective planes within the solid solution.

The data set showed that the optimal mixture or alloy was produced by calcination between 1,000° C. and 1,075° C. representing a mixture of crystalline and amorphous states.

Figure 2:
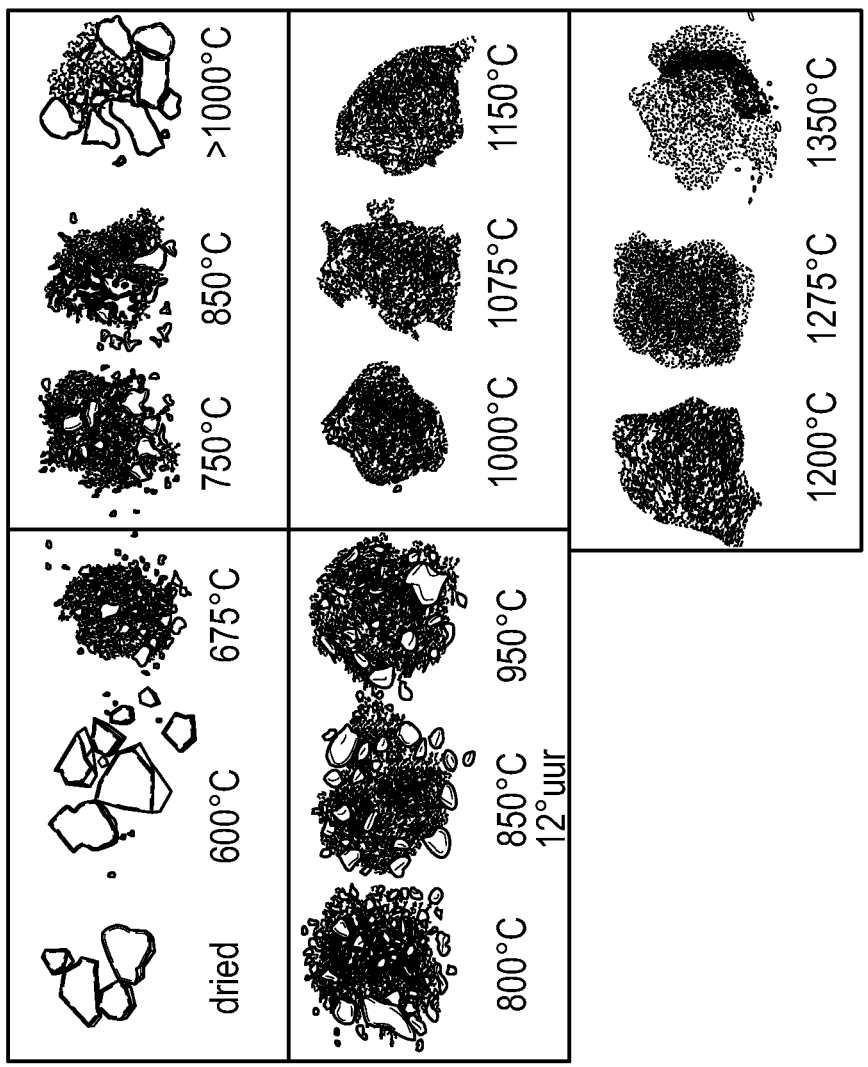
FIG. 2 provides a series of photographs showing catalyst s calcined at different temperatures, in accordance with various aspects.

In addition to the XRD data, the series of images provided as FIG. 2 shows the progression of color of the samples towards the desired "olive green" color needed for optimal mixture or alloy. The more intense the green, the more crystalline the material is. As shown in FIG. 2, calcination at 1,150° C. and above rendered the most intense green, indicating 100% crystallinity of the mixture or alloy at virtually zero catalytic surface area.

Example 3—Catalyst Surface Area

Catalyst surface area, determined according to the Braunauer-Emmett-Teller (BET) theory, was determined as a function of the calcination temperature described herein above in Example 1. Results are shown in Table 1:

TABLE 1

| Calcination Temperature (° C.) | BET Surface Area (m²/g) |
|---|---|
| 850 | 26 |
| 1000 | 9 |
| 1150 | Less than 1 |

Example 4—Size of MgO s

The size of the MgO s used in Example 1 was controlled in some aspects. The size was controlled by milling a quantity of MgO s for about 6 hours in a Netzsch ball mill. This procedure resulted in the size distribution shown below in Table 2.

TABLE 2

| $d_{10}$ | 0.238 microns (μm) |
|---|---|
| $d_{50}$ | 0.430 microns (μm) |
| $d_{90}$ | 0.791 microns (μm) |
| $d_{99}$ | 1.400 microns (μm) |

Example 5—Syngas Production

A catalyst formed according to the protocol of Example 1 was used to prepare syngas.

The reactor is a 3 meter long tube. The tube is evenly divided along a longitudinal axis into six zones. Zones 2-6 are packed with the catalyst. The inlet (which is adjacent to zone 1), Zone 1 (which is between the inlet and Zone 2) and outlet (which is adjacent to Zone 6) are packed with Accu Grain 8™ (a high alumina support media available from Saint-Gobain NorPro, Stow OH). A total of 6,950 ml of catalyst was deployed in Zones 2-6. Data showing the formation of syngas and their respective wt % of products are shown below in Table 3.

TABLE 3

| Feed Gas (8.61 Bar Flow) | | | | | Zone 1 | | Zone 2 | | Zone 3 | | Zone 4 | |
|---|---|---|---|---|---|---|---|---|---|---|---|---|
| Time (s) | $CO_2$ | $CH_4$ | $H_2O$ SCFH | $H_2O$ mL/Min | GHSV | Interior (° C.) | Set (° C.) | Interior (° C.) | Set (° C.) | Interior (° C.) | Set (° C.) | Interior (° C.) | Set (° C.) |
| 730 | 0 | 80 | 177 | 50 | 1028 | 1037 | 1037 | | 1037 | | 1037 | | 1037 |
| 800 | | | | | | 931 | | 823 | | 861 | | 848 | |
| 830 | | | | | | 931 | | 823 | | 857 | | 897 | |
| 900 | | | | | | 934 | | 816 | | 856 | | 869 | |
| 930 | | | | | | 935 | | 813 | | 853 | | 893 | |
| 1000 | | | | | | 937 | | 813 | | 853 | | 892 | |
| 1030 | | | | | | 937 | | 812 | | 869 | | 890 | |
| 1100 | | | | | | 937 | | 813 | | 852 | | 889 | |
| 1130 | | | | | | 937 | | 813 | | 852 | | 887 | |

| Feed Gas (8.61 Bar Flow) | Zone 5 | | Zone 6 | | Converted Product (wt %) | | | |
|---|---|---|---|---|---|---|---|---|
| Time (s) | Interior (° C.) | Set (° C.) | Interior (° C.) | Set (° C.) | CO | $CO_2$ | $CH_4$ | $H^2$ |
| 730 | | 1037 | | 1010 | | | | |
| 800 | 958 | 977 | | | 21.39 | 1.28 | 1.23 | 76.92 |
| 830 | 959 | 978 | | | 20.79 | 1.31 | 0.93 | 77.48 |
| 900 | 959 | 972 | | | 20.89 | 1.27 | 0.99 | 77.67 |
| 930 | 955 | 976 | | | 21.27 | 1.06 | 1.13 | 77.60 |
| 1000 | 955 | 976 | | | 21.14 | 1.06 | 1.13 | 77.57 |
| 1030 | 952 | 974 | | | 21.13 | 1.04 | 1.19 | 77.51 |
| 1100 | 951 | 973 | | | 21.18 | 1.08 | 1.21 | 77.44 |
| 1130 | 948 | 971 | | | 21.31 | 0.98 | 1.41 | 77.31 |

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

EXEMPLARY ASPECTS

The following exemplary aspects are provided, the numbering of which is not to be construed as designating levels of importance:

Aspect 1 provides a catalyst for catalyzing the production of syngas from a mixture comprising steam and a hydrocarbon, the catalyst comprising:
  a metal oxide substrate comprising a nickel species, wherein an exposed surface of the catalyst comprises at least some of the nickel species and the exposed surface is substantially nonporous.

Aspect 2 provides the catalyst of Aspect 1, wherein a pore volume of the catalyst is less than 0.1 $cm^3/g$.

Aspect 3 provides the catalyst of any of Aspects 1 or 2, wherein the hydrocarbon is a $C_1$-$C_4$ hydrocarbon.

Aspect 4 provides the catalyst of any of Aspects 1-3, wherein the hydrocarbon comprises mostly methane.

Aspect 5 provides the catalyst of any of Aspects 1-4, wherein the catalyst is free of exposure purposefully introduced to carbon dioxide.

Aspect 6 provides the catalyst of any of Aspects 1-5, wherein the catalyst is sintered by high temperature calcination.

Aspect 7 provides the catalyst of any of Aspects 1-6, wherein a molar ratio of the steam to the hydrocarbon in the mixture is in a range of from about 2:1 to 1:1.

Aspect 8 provides the catalyst of any of Aspects 1-7, wherein a molar ratio of a steam to hydrocarbon is in a range of from about 1:5 to 1:1.

Aspect 9 provides the catalyst of any of Aspects 1-8, wherein a molar ratio of a steam to hydrocarbon is in a range of from about 1:2 to 1:1.

Aspect 10 provides the catalyst of any of Aspects 1-9, wherein a molar ratio of a steam to hydrocarbon does not exceed 2.5:1.

Aspect 11 provides the catalyst of any of Aspects 1-10, wherein the metal oxide substrate comprises NiO, CoO, FeO, MnO, MgO, or a mixture thereof.

Aspect 12 provides the catalyst of any of Aspects 1-11, wherein the metal oxide substrate comprises MgO.

Aspect 13 provides the catalyst of any of Aspects 1-12, wherein the metal oxide substrate is substantially spherical, substantially cylindrical, substantially flat, or comprises an undulating profile.

Aspect 14 provides the catalyst of any of Aspects 1-13, wherein the metal oxide substrate is a monolithic structure.

Aspect 15 provides the catalyst of any of Aspects 1-14, wherein the nickel species is 0.2 wt % to 30 wt % of the catalyst.

Aspect 16 provides the catalyst of any of Aspects 1-15, wherein the nickel species is 12 wt % to 15 wt % of the catalyst.

Aspect 17 provides the catalyst of any of Aspect 1-16, wherein the nickel species is homogenously distributed about the metal oxide substrate.

Aspect 18 provides the catalyst of any of Aspects 1-17, wherein the nickel species comprises less than 1 wt % elemental nickel.

Aspect 19 provides the catalyst of any of Aspects 1-18, wherein the nickel species is free of elemental nickel.

Aspect 20 provides the catalyst of any of Aspects 1-19, wherein the nickel species is homogenously distributed about the metal oxide substrate.

Aspect 21 provides the catalyst of Aspect 20, wherein a major portion of the nickel species is located proximate to a surface of the metal oxide substrate.

Aspect 22 provides the catalyst of any of Aspects 1-22, wherein at least a portion of the nickel species is exposed on a surface of the metal oxide substrate.

Aspect 23 provides the catalyst of Aspect 22, wherein the portion of the nickel species exposed on a surface of the metal oxide substrate is in a range of from about 10 wt % to about 30 wt % of the nickel species.

Aspect 24 provides the catalyst of any of Aspects 22 or 23, wherein the portion of the nickel species exposed on a surface of the metal oxide substrate is in a range of from about 14 wt % to about 18 wt % of the nickel species.

Aspect 25 provides the catalyst of any of Aspects 1-24, wherein the largest dimension of the catalyst is in a range of 20 μm to 26 mm.

Aspect 26 provides the catalyst of any of Aspects 1-25, wherein the largest dimension of the catalyst is in a range of 4 mm to 6 mm.

Aspect 27 provides the catalyst of any of Aspects 1-26, wherein the catalyst further comprises potassium ions.

Aspect 28 provides the catalyst of Aspect 27, wherein the majority of the potassium ions are in/at a surface of the metal oxide substrate.

Aspect 29 provides the catalyst of any of Aspects 27 or 28, wherein the potassium ions range from about 0.2 wt % to about 5 wt % of the catalyst.

Aspect 30 provides the catalyst of any of Aspects 27-29, wherein the potassium ions range from about 1 wt % to about 2 wt % of the catalyst.

Aspect 31 provides the catalyst of any of Aspects 1-30, wherein the catalyst comprises less than about 2 wt % free elemental nickel, free nickel oxide, or a mixture thereof in the nickel species.

Aspect 32 provides the catalyst of any of Aspects 1-31, wherein the catalyst comprises less than about 0.5 wt % free elemental nickel, free nickel oxide, or a mixture thereof in the nickel species.

Aspect 33 provides the catalyst of any of Aspects 1-32, wherein the catalyst is free of free elemental nickel, free nickel oxide, or a mixture thereof in the nickel species.

Aspect 34 provides the catalyst of any of Aspects 1-33, wherein the catalyst is a catalytic alloy catalyst.

Aspect 35 provides a method of making the catalyst of any of Aspects 1-34, the method of making the catalyst
  mixing a nickel solution into a metal oxide powder with incipient wetness impregnation, to form a paste;
  or mixing powders in an oxide form to make a slurry; and
  drying the paste or slurry to produce a dispersed powder;
    calcining the dried powder.

Aspect 36 provides the method of Aspect 35, wherein the nickel solution comprises nickel(II) nitrate hexahydrate, nickel(II)di-acetate, nickel(II)carbonate, or a combination thereof.

Aspect 37 provides the method of Aspect 35 or 38, wherein the nickel solution comprises nickel(II) nitrate hexahydrate.

Aspect 38 provides the method of any of Aspects 35-37, wherein the calcining of the dried powder is performed at a temperature in a range of from about 400° C. to about 2000° C. for a time in a range of from about 0.5 hours to about 12 hours.

Aspect 39 provides the method of any of Aspects 35-38, wherein calcining the dried powder is performed at a temperature in a range of from about 500° C. to about 1500° C. for a time in a range of from about 1 hour to about 3 hours.

Aspect 40 provides the method of any of Aspects 35-39, wherein calcining the dried powder is performed at a temperature in a range of from about 950° C. to about 1050° C. for a time in a range of from about 1 hour to about 3 hours.

Aspect 41 provides the method of any of Aspects 35-40, wherein the calcining of the s is performed at a temperature in a range of from about 800° C. to about 1500° C. for a time in a range of from about 0.5 hours to about 4 hours.

Aspect 42 provides the method of any of Aspects 35-41, wherein calcining the dried powder is performed at a temperature in a range of from about 900° C. to about 1100° C. for a time in a range of from about 1 hour to about 3 hours.

Aspect 43 provides the method of any of Aspects 35-42, further comprising treating the s with potassium nitrate, potassium acetate, potassium carbonate, or a mixture thereof.

Aspect 44 provides the method of any of Aspects 35-43, wherein a $d_{50}$ of the metal oxide powder is in a range of from about 2 μm to about 120 μm.

Aspect 45 provides the method of any of Aspects 35-44, wherein a $d_{50}$ of the metal oxide powder is in a range of from about 5 μm to about 100 μm.

Aspect 46 provides a method of using the catalyst of any of Aspects 1-45, the method comprising:
contacting the catalyst with the mixture of steam and hydrocarbon to produce the syngas comprising carbon monoxide and hydrogen and less than about 2 wt % methane.

Aspect 47 provides the method of using the catalyst of Aspect 46, wherein the hydrogen and carbon monoxide are produced in a molar ratio in a range of from about 2:1 to about 4:1.

Aspect 48 provides the method of using the catalyst of any of Aspects 46 or 47, wherein the molar ratio of the hydrogen to carbon monoxide produced is variable.

Aspect 49 provides the method of using the catalyst of any of Aspects 46-48, further comprising activating the catalyst.

Aspect 50 provides the method of using the catalyst of Aspect 49, wherein activating the catalyst comprises contacting the catalyst with a mixture of hydrogen gas and nitrogen gas for a time in a range of from about 1 hour to about 6 hours at a temperature in a range of from about 400° C. to about 600° C., wherein a ratio of hydrogen gas to nitrogen gas is in a range of from about 90:10 to about 70:30.

Aspect 51 provides the method of using the catalyst of any of Aspects 46-50, wherein at least 70 wt % of the mixture of steam and hydrocarbon that contacts the catalyst are converted to carbon monoxide and hydrogen per turn.

Aspect 52 provides the method of using the catalyst of any of Aspects 46-51, wherein at least 90 wt % of the mixture of steam and hydrocarbon that interact with the catalyst are converted to carbon monoxide and hydrogen per turn.

Aspect 53 provides the method of using the catalyst of any of Aspects 46-52, wherein about 70 wt % to about 99 wt % of the mixture of steam and hydrocarbon that interact with the catalyst are converted to carbon monoxide and hydrogen per turn.

Aspect 54 provides the method of using the catalyst of any of Aspects 46-53, wherein about 90 wt % to about 99 wt % of the mixture of steam and hydrocarbon that interact with the catalyst are converted to carbon monoxide and hydrogen per turn.

Aspect 55 provides the method of using the catalyst of any of Aspects 46-54, wherein about 95 wt % to about 98 wt % of the mixture of steam and hydrocarbon that interact with the catalyst are converted to carbon monoxide and hydrogen per turn.

Aspect 56 provides the method of using the catalyst of any of Aspects 46-55, wherein the syngas comprises less than 4 wt % methane.

Aspect 57 provides the method of using the catalyst of any of Aspects 46-56, wherein the syngas comprises less than 2 wt % methane.

Aspect 58 provides the method of using the catalyst of any of Aspects 46-57, wherein the catalyst performs at a gas hourly space velocity of about 1000 to about 20000.

Aspect 59 provides the method of using the catalyst of any of Aspects 46-58, wherein the catalyst performs at a gas hourly space velocity of about 3000 to about 5000.

Aspect 60 provides the method of using the catalyst of any of Aspects 46-59, wherein the reaction is performed at a temperature greater than about 815° C.

Aspect 61 provides the method of using the catalyst of any of Aspects 46-60, wherein the reaction is performed at a temperature greater than about 954° C.

Aspect 62 provides the method of using the catalyst of any of Aspects 46-61, wherein the reaction is performed at a temperature in a range of from about 276° C. to about 1371° C.

Aspect 63 provides the method of using the catalyst of any of Aspects 46-62, wherein the reaction is performed at a temperature in a range of from about 815° C. to about 1093° C.

Aspect 64 provides the method of using the catalyst of any of Aspects 46-63, wherein the catalyst is substantially free of coking during performance of the method.

Aspect 65 provides the method of using the catalyst of any of Aspects 46-64, wherein the catalyst is substantially free of coking during performance of the method with continuous operation for at least 1 year.

Aspect 66 provides the method of using the catalyst of any of Aspects 46-65, wherein the catalyst is substantially free of coking during continuous operation for at least 2 years.

Aspect 67 provides the method of using the catalyst of any of Aspects 46-66, wherein the catalyst is substantially free of coking during continuous operation for at least 3 years.

Aspect 68 provides the method of using the catalyst of any of Aspects 46-47, further comprising cleaning the catalyst with steam and using the catalyst for further syngas production.

Aspect 69 provides the method of using the catalyst of any of Aspects 46-48, wherein any component of the mixture of steam and hydrocarbon are provided from an industrial process stream.

Aspect 70 provides the method of using the catalyst of any of Aspects 46-69, wherein heat is provided from an industrial process source.

Aspect 71 provides the method of using the catalyst of any of Aspects 46-70, wherein the mixture of steam and hydrocarbon are contacted with the catalyst a pressure in a range of from about 25 KPa to about 3500 KPa.

Aspect 72 provides the method of using the catalyst of any of Aspects 46-71, wherein the mixture of steam and hydrocarbon are contacted with the catalyst a pressure in a range of from about 30 KPa to about 2100 KPa.

Aspect 73 provides the method of using the catalyst of any of Aspects 46-72, wherein a feed stream comprising the mixture of steam and hydrocarbon has a flow rate, measured as gas hourly space velocity (GHSV), of from about 500 $h^{-1}$ to about 15000 $h^{-1}$.

Aspect 74 provides the method of using the catalyst of any of Aspects 46-73, wherein a feed stream comprising the mixture of steam and hydrocarbon has a flow rate, measured as gas hourly space velocity (GHSV), of from about 1000 $h^{-1}$ to about 10000 $h^{-1}$.

Aspect 75 provides the method of any of Aspects 46-74, further comprising treating the catalyst with steam before or after producing syngas.

Aspect 76 provides the method of Aspect 75, wherein the catalyst is treated with steam at a temperature in a range of from about 150° C. to about 1000° C. for 1 hour to 20 hours.

Aspect 77 provides the method of any of Aspects 75 or 76, wherein the catalyst is treated with steam at a temperature in a range of from about 200° C. to about 260° C. from 2 hours to 15 hours.

Aspect 78 provides the method of any of Aspects 75-77, further comprising supplementing the produced carbon monoxide and hydrogen with an external source of hydrogen.

Aspect 79 provides the method of Aspect 78, wherein the external source of hydrogen is a renewable source of hydrogen.

Aspect 80 provides the method of Aspect 79, wherein the renewable source of hydrogen is produced by electrolysis.

Aspect 81 provides the method of any of Aspects 46-80, wherein the C1-C4 hydrocarbon is sourced from a renewable natural gas, a landfill emission, an oil well emission, a coal mine emission, or a mixture thereof.

Aspect 82 provides the method of any of Aspects 46-81, wherein an amount of energy used to generate steam is at least 50% less than a corresponding amount of energy used to create steam using a comparative catalyst that differs from the catalyst of any of Aspects 1-81.

Aspect 83 provides the method of any of Aspects 46-82, wherein an amount of carbon dioxide emitted is in a range of from about 90% to about 95% less than a corresponding amount of carbon dioxide emission from a method using a using a comparative catalyst that differs from the catalyst of any of Aspects 1-82.

Aspect 84 provides a method of using syngas produced according to any of Aspects 46-83, the method comprising:
  forming a product from a feedstock comprising the syngas.

Aspect 85 provides the method of using syngas of Aspect 84, wherein the product comprises a paraffinic base oil, a paraffinic wax, a solvent, a fuel, ammonia, methanol, ethanol, propanol, butanol, pentanol, acetic acid, dimethoxyethane, purified $H_2$, purified CO, a blend of hydrogen and carbon monoxide, amide, dimethylcarbonate, ethylmethylcarbonate, oxo-alcohols, graphene, carbon fibers, carbon nanotubes, carbon black, graphite, or a mixture thereof.

Aspect 86 provides the method of using syngas of any of Aspects 84 or 85, wherein the syngas is directly fed into the method for forming the product.

Aspect 87 provides an assembly comprising: a reaction vessel comprising the catalyst of any of Aspects 1-86, located within the reaction vessel.

Aspect 88 provides the assembly of Aspect 87, wherein the reaction vessel comprises a metal tube.

Aspect 89 provides the assembly of Aspect 88, wherein the metal tube comprises a nickel alloy.

Aspect 90 provides the assembly of any of Aspects 87-89, wherein the tube comprises a plurality of the catalyst s distributed about an interior of the tube.

Aspect 91 provides the assembly of any of Aspects 87-90, further comprising a heat source in thermal communication with the reaction vessel.

Aspect 92 provides the assembly of any of Aspects 87-91, wherein the assembly is an existing assembly having the catalyst retrofit into the existing assembly.

What is claimed is:

1. A method of using a catalyst for catalyzing production of syngas from a mixture comprising steam and a hydrocarbon, the catalyst comprising:
   a metal oxide substrate comprising a nickel species, wherein an exposed surface of the catalyst comprises at least some of the nickel species and the exposed surface is substantially nonporous, the method comprising:
   contacting the catalyst with the mixture of steam and hydrocarbon to produce the syngas comprising carbon monoxide and hydrogen and containing less than about 5 wt % methane, wherein a molar ratio of the hydrogen to carbon monoxide produced is variable from about 1:1 to 4:1.

2. The method of using the catalyst of claim 1, wherein a molar ratio of the hydrogen to carbon monoxide produced is variable from about 2:1 to 4:1 molar ratio.

3. The method of claim 1, wherein the catalyst is placed in an existing reformer assembly to retrofit the existing assembly.

4. The method of using the catalyst of claim 1, wherein at least 70 wt % of the mixture of steam and hydrocarbon that contacts the catalyst are converted to carbon monoxide and hydrogen per turn.

5. The method of using the catalyst of claim 1, wherein about 70 wt % to about 99 wt % of the mixture of steam and hydrocarbon that contact the catalyst are converted to carbon monoxide and hydrogen per turn.

6. The method of using the catalyst of claim 1, wherein the method performs at a gas hourly space velocity of about 1000 to about 20000.

7. The method of using the catalyst of claim 1, wherein the method is performed at a temperature greater than about 815° C.

8. The method of using the catalyst of claim 1, wherein the method is performed at a temperature in a range of from about 276° C. to about 1371° C.

9. The method of using the catalyst of claim 1, wherein the catalyst is substantially free of coking during performance of the method.

10. The method of using the catalyst of claim 1, wherein any component of the mixture of steam and hydrocarbon are provided from an industrial process stream.

11. The method of using the catalyst of claim 1, wherein the mixture of steam and hydrocarbon are contacted with the catalyst a pressure in a range of from about 25 KPa to about 3500 KPa.

12. The method of claim 1, wherein the hydrocarbon is sourced from a renewable natural gas, a landfill emission, an oil well emission, a coal mine emission, or a mixture thereof.

13. The method of claim 1, wherein an amount of carbon dioxide emitted is in a range of from about 25% to about 97% less than a corresponding amount of carbon dioxide emission from a method using a using a comparative catalyst that differs from the catalyst.

14. A method of using syngas produced according to the method of claim 1, the method comprising:
  forming a product from a feedstock comprising the syngas.

15. The method of using syngas of claim 14, wherein the product comprises a paraffinic base oil, a paraffinic wax, a solvent, a fuel, ammonia, methanol, ethanol, propanol, butanol, pentanol, acetic acid, dimethoxyethane, purified $H_2$, purified CO, a blend of hydrogen and carbon monoxide, amide, dimethylcarbonate, ethylmethylcarbonate, oxo-alcohols, graphene, carbon fibers, carbon nanotubes, carbon black, graphite, or a mixture thereof.

16. The method of using syngas of claim 14, wherein the syngas is not subjected to any additional processing to alter the molar ratio of the syngas constituents.

17. The catalyst of claim 1, wherein a pore volume of the catalyst is less than 0.1 cm$^3$/g.

18. The catalyst of claim 1, wherein the hydrocarbon is a C1-C4 hydrocarbon.

19. The catalyst of claim 1, wherein the catalyst is free of purposefully introduced exposure to carbon dioxide.

20. The catalyst of claim 1, wherein the catalyst is sintered by high temperature calcination.

21. The catalyst of claim 1, wherein a molar ratio of the steam to the hydrocarbon in the mixture is in a range of from about 2:1 to 1:1.

22. The catalyst of claim 1, wherein a molar ratio of a steam to hydrocarbon does not exceed 2.5:1.

23. The catalyst of claim 1, wherein the metal oxide substrate comprises NiO, CoO, FeO, MnO, MgO, or a mixture thereof.

24. The catalyst of claim 1, wherein the nickel species is homogeneously distributed about the metal oxide substrate.

25. The catalyst of claim 1, wherein at least a portion of the nickel species is exposed on a surface of the metal oxide substrate.

26. The catalyst of claim 1, wherein the catalyst comprises less than about 2 wt % free elemental nickel, free nickel oxide, or a mixture thereof in the nickel species.

27. A method of making the catalyst of claim 1, the method of making the catalyst comprising:
  mixing a nickel solution into a metal oxide powder with incipient wetness impregnation, to form a paste;
  or mixing powders in an oxide form to make a slurry;
  drying the paste or slurry to produce a powder; and
  calcining the dried powder.

28. The method of claim 27, wherein the nickel solution comprises nickel(II) nitrate hexahydrate, nickel(I)di-acetate, nickel(II)carbonate, or a combination thereof.

29. The method of claim 27, wherein the calcining of the dried powder is performed at a temperature in a range of from about 400° C. to about 2000° C. for a time in a range of from about 0.5 hours to about 12 hours.

* * * * *